(12) United States Patent
Wang

(10) Patent No.: US 9,729,559 B2
(45) Date of Patent: Aug. 8, 2017

(54) METHOD AND APPARATUS FOR TRACING ATTACK SOURCE OF ABNORMAL NETWORK TRAFFIC

(71) Applicant: BEIJING RUNSTONE TECHNOLOGY INCORPORATION, Beijing (CN)

(72) Inventor: Lijun Wang, Beijing (CN)

(73) Assignee: BEIJING RUNSTONE TECHNOLOGY INCORPORATION, Beijing (CN)

( * ) Notice: Subject to any disclaimer, the term of this patent is extended or adjusted under 35 U.S.C. 154(b) by 0 days.

(21) Appl. No.: 14/349,071

(22) PCT Filed: Nov. 22, 2012

(86) PCT No.: PCT/CN2012/085039
§ 371 (c)(1),
(2) Date: Apr. 2, 2014

(87) PCT Pub. No.: WO2013/082997
PCT Pub. Date: Jun. 13, 2013

(65) Prior Publication Data
US 2014/0230059 A1    Aug. 14, 2014

(30) Foreign Application Priority Data
Dec. 7, 2011  (CN) .......................... 2011 1 0402733

(51) Int. Cl.
*H04L 29/06* (2006.01)

(52) U.S. Cl.
CPC ...... *H04L 63/1416* (2013.01); *H04L 63/1441* (2013.01); *H04L 2463/146* (2013.01)

(58) Field of Classification Search
CPC ........... H04L 29/06884; H04L 49/253; H04W 16/00; G06F 21/577
See application file for complete search history.

(56) References Cited

U.S. PATENT DOCUMENTS

2008/0262990 A1* 10/2008 Kapoor et al. .................. 706/20

* cited by examiner

*Primary Examiner* — Joseph P Hirl
*Assistant Examiner* — Leynna Truvan

(57) ABSTRACT

The present invention provides a method and an apparatus for tracing an attack source in the case of an abnormal network traffic, where said method comprises: from the network node(s) of an attack link, any or multiple said network nodes are selected as a tracing start point(s) and there into, said attack link is a communication link between an attacked target and an attack source. According to said tracing start point(s), a higher-level network node of said attack link is identified stepwise until a final attack source is confirmed. By adopting said technical solution provided by the present invention, the problems that the network security mechanisms in related technologies can only alleviate a network attack rather than position an attack source are solved, thus an effect can be achieved to trace and position the attack source in a reverse direction.

1 Claim, 4 Drawing Sheets

---

From the network node(s) in an attack link, any or multiple said network nodes are selected as a tracing start point(s), where said attack link is a communication link between an attacked target and an attack source;   — S102

▼

A higher-level network node in said attack link is identified stepwise according to said tracing start point(s) until a final attack source is confirmed.   — S104

METHOD AND APPARATUS FOR TRACING ATTACK SOURCE OF ABNORMAL NETWORK TRAFFIC

CROSS REFERENCE OF RELATED APPLICATION

This is a U.S. National Stage under 35 U.S.C. 371 of the International Application PCT/CN2012/085039, filed Nov. 22, 2012, which claims priority under 35 U.S.C. 119(a-d) to CN 201110402733.4, filed Dec. 7, 2011.

BACKGROUND OF THE PRESENT INVENTION

Field of Invention

The present invention relates to the field of network communication, specifically, to a method and apparatus for tracing attack source in the case of abnormal network traffic.

Description of Related Arts

At present, the network-based attacks mostly take advantage of the limits of network resources and system resources or the imperfection of network protocols and authentication mechanisms themselves to launch a large-scale network attack in short time in order to consume the specific resources and attack the targets. The existing network security mechanisms including the intrusion detection system (IDS), firewall and virtual private network (VPN) as well as attack-tolerant techniques merely defense passively upon a network attack: for example, setting up a protection algorithms such as Random Drop, SYN Cookie, bandwidth restriction, or realizing linkage between IDS and firewall as well as analyzing attacks by technical experts, etc.

Most of the network security mechanisms as above work little. They can merely alleviate the network attacks rather than position the source of attack (that is, attack source). Thus, the network-based attacks have become a serious obstacle to current network information system. Moreover, the virtual nature of network itself causes very big difficulty upon enforcing laws.

As for the problems of related techniques as above, no effective solution has been put forward yet.

SUMMARY OF THE PRESENT INVENTION

Aiming at the problems of related techniques as above, the main purpose of the present invention is to provide a method and an apparatus for tracing the attack source in the case of abnormal network traffic in order to solve at least the problems as above.

In order to realize the purpose as above, according to one aspect of the present invention, a method for tracing an attack source in the case of abnormal network traffic is provided. It comprises: from the network node(s) of an attack link, any or multiple said network nodes are selected as a tracing start point(s) and there into, said attack link is a communication link between an attacked target and an attack source; and according to said tracing start point(s), a higher-level network node of said attack link is identified stepwise until a final attack source is confirmed.

In order to realize the purpose as above, according to another aspect of the present invention, an apparatus for tracing an attack source in the case of abnormal network traffic is provided. It comprises: a selection module used to select any or multiple said network nodes from the network node(s) of attack network as a tracing start point(s), where said attack link is a communication link between an attacked target and an attack source. A determination module used to identify stepwise a higher-level network node(s) of said attack network according to said tracing start point(s) until a final attack source is confirmed.

Through the present invention, the technical means is employed to select any network node(s) in an attack link as a tracing start point(s) to identify stepwise a higher-level network node. Thus, the problems that the network security mechanisms in related techniques can only alleviate the network attack rather than position the source of attack are solved. Therefore, an effect of tracing and positioning the attack source in a reverse direction is achieved.

BRIEF DESCRIPTION OF THE DRAWINGS

The drawings constituting one part of the present application are used to provide further understanding on the present invention. Nevertheless, the schematic embodiments and their descriptions according to the present invention are merely used to explain the present invention and do not constitute any inappropriate limitation on the present invention. In the drawings.

DETAILED DESCRIPTION OF THE PREFERRED EMBODIMENT

It is necessary to note that the embodiments and the features there into can be combined mutually if no conflict will be brought out.

Below, the present invention is described in detail with reference to the drawings and the embodiments.

Figure 1:
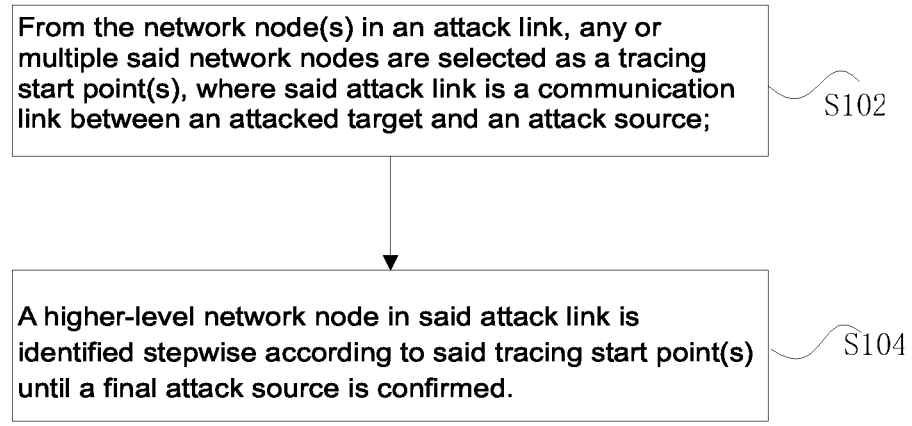
FIG. 1 is a schematic diagram of the method for tracing the attack source of abnormal network traffic in the embodiments according to the present invention.

FIG. 1 is a schematic diagram of the method for tracing the attack source of abnormal network traffic in the embodiments according to the present invention. As shown in FIG. 1, this method comprises:

Step S102: from the network node(s) of an attack link, any or multiple said network nodes are selected as a tracing start point(s), where said attack link is a communication link between an attacked target and an attack source;

Step S104: according to said a tracing start point(s), a higher-level network node of said attack link is identified stepwise until a final attack source is confirmed.

Through the processes as above, the technical means is employed to identify stepwise the higher-level network node(s) in said attack link until the attack source(s) is confirmed finally according to the tracing start point(s).

Thus, the attack source can be traced and positioned backward and the enforcement of laws on network security can be improved.

In Step S102, any or multiple network nodes can be selected as a tracing start point(s) and also a network node(s) can be selected as a tracing start point(s) according to a preset condition(s). For example: the data packet payload via the port(s) of network node(s) in said attack link is collected according to a preset period; said tracing start point(s) is determined according to the data packet payload collected currently and that collected in last said preset period.

In one preferred embodiment according to the present invention, said data packet payload is the average for each data packet payload in said preset period. Hereinto, this average for each data packet payload in a preset period can be determined through below method: Average for each data packet payload in a preset period=Average bandwidth in a preset period/Total quantity of data packet in a preset period.

In one preferred embodiment according to the present invention, in the case of multiple said higher-level network nodes, the steps of processing as follows can also be included: the multiple higher-level network nodes are discriminated according to the matching degree with said attack link, wherein said matching degree is used to indicate the level of similarity between said average for each data packet payload via a tracing start point(s) in a preset period and the averages for each data packet payload via multiple said higher-level network nodes in a preset period.

During the specific implementation, determination of said tracing start point(s) according to the data packet payload collected currently and that collected in last said preset period can be realized through the processes as follows: a fingerprint of the flow via the port(s) of said network node(s) of an attack link is determined according to the data packet payload collected currently and that collected in last said preset period, wherein said flow fingerprint is calculated with the formula as follows: Flow fingerprint=[1−(▲P/▲BP)]×100%, ▲P=P0−(P−1), ▲BP=BP0−(BP−1), where: P0 indicates current data; (P−1) indicates the data in last period of current preset period; BP0 indicates the data at same moment yesterday; (BP=1) indicates the data yesterday in last period of current preset period; in the case that said flow fingerprint doesn't reach a preset threshold value, the network node(s) corresponding to said flow fingerprint can be used as a tracing start point (s).

In Step S104, that is, the determination of the higher-level network node(s) of said attack link according to said tracing start point(s), can comprise the processes as follows: acquisition of the increment of incoming flow to said tracing start point (s) and the increment of outgoing flow from said higher-level network node(s), wherein said increment of incoming flow is the increased flow in the case that the network traffic received by said tracing starting point(s) is abnormal compared to normal network traffic. Said increment of outgoing flow is the increased network flow in the case that the network traffic transmitted from said higher-level network node(s) is abnormal compared to normal network traffic. Determination of said higher-level node as a new tracing start point according to the ratio between said increment of incoming traffic and said increment of outgoing traffic; identification stepwise of a higher-level network node of said new tracing start point in said attack network according to said new tracing start point.

In Step S104, the final attack source(s) can be identified through the following method: when the quantity of higher-level network node(s) is 0, the network node(s) in the next level lower to said higher-level network node(s) will be determined as the final attack source(s).

Figure 2:
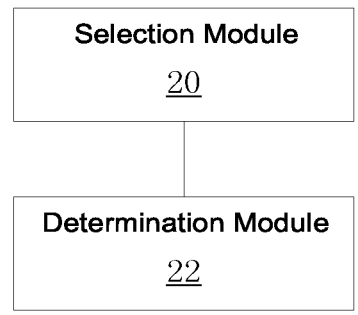
FIG. 2 is a block diagram showing the apparatus for tracing the attack source of abnormal network traffic in the embodiments according to the present invention.

In this embodiment, an apparatus for tracing attack source in the case of abnormal network traffic is also provided. This apparatus is used to implement the embodiments and the preferred embodiments as above. What already described will not be introduced further here and the modules concerned in the apparatus are described below. As used hereinafter, the term of "module" can realize the combination of software and/or hardware of intended functions. The apparatus described in the following embodiments is preferably realized with software; nevertheless, a hardware or combination of software and hardware can also be feasible and has been conceived to realize same function. FIG. 2 is a structural block diagram of a service quality-processing device in the embodiments according to the present invention. As shown in FIG. 2, this apparatus comprises:

A selection module 20 connected to a determination module 22 which is used to select any or multiple said network nodes from the network node(s) of attack network as a tracing start point(s), where said attack link is a communication link between an attacked target and an attack source;

The determination module 22, which is used to identify stepwise a higher-level network node(s) of said attack network, according to said tracing start point(s) until a final attack source is confirmed.

Figure 3:
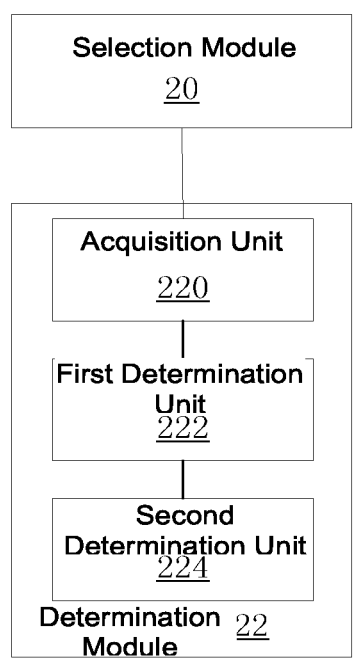
FIG. 3 is a structural schematic diagram showing the apparatus for tracing the attack source of abnormal network traffic in the embodiments according to the present invention.

In one preferred embodiment according to the present invention, as shown in FIG. 3, said determination module 22 can also comprise the following processing units:

An acquisition unit 220 connected to the first determination unit 222 which is used to acquire the increment of incoming flow to said tracing start point (s) and the increment of outgoing flow from said higher-level network node(s), wherein said increment of incoming flow is the increased flow in the case that the network traffic received by said tracing starting point(s) is abnormal compared to normal network traffic. Said increment of outgoing flow is the increased network flow in the case that the network traffic transmitted from said higher-level network node(s) is abnormal compared to normal network traffic;

The first determination unit 222 connected to the second determination unit 224 which is used to determine said higher-level node(s) as a new tracing start point(s) according to the ratio between said increment of incoming flow and said increment of outgoing flow;

The second determination unit 224 used to identify stepwise a higher-level network node(s) of said new tracing start point(s) of said attack link according to said new tracing start point(s) until a final attack source is confirmed.

In order to understand better the embodiments described as above, the specific example and the related drawings are referred to for the description in detail. Before the technical solution of the embodiments is described specifically below, some concepts and definitions related to the example will be introduced in advance here.

1. Per Package Data Average (PPDA)

It is the average size for each data packet in an acquisition period reflecting the regular feature of data packet in one period. The formula to calculate it is as follows:

Per Package Data Average in a period (in/out)=Average bandwidth in a period (in/out)/Total quantity of data packets in a period (in/out) or it can be modified as follows:

Per Package Data Average in a period (in)=Average bandwidth in a period (in)/Total quantity of data packets in a period (in)

Per Package Data Average in a period (out)=Average bandwidth in a period (out)/Total quantity of data packets in a period (out)/

The abbreviation is PPDA (Per Package Data Average)

2. Fingerprint of Data Packet and Flow

Current data of port P: P0 represents current data; P−1 is the data in the first period before current data acquisition period; P−2 is the data in the second period before current data acquisition period; FP1 is the data forecasted for the period first next to current data acquisition period; FP2 is the data forecasted for the period second next to current data acquisition period.

FP2 Data forecasted for the period second next to current data acquisition period FP2=2*FP1/(P−1/P0+P0/FP1)

FP1 Data forecasted for the period first next to current data acquisition period FP1=2*P0/(P−2/P−1+P−1/P0)

P0 Current data

P−1 Data in the first period before current data acquisition period

P−2 Data in the second period before current data acquisition period

The historical data of the day before (it is the reference base used to balance the fluctuation of forecasted data), where BP0 is the data yesterday at the same moment to P0 data and the rest are in same manner;

BP2 Data in the last two periods of the day before

BP1 Data in the last period of the day before

BP0 Data at the same moment of the day before

BP−1 Data in the first period before P0 of the day before

BP−2 Data in the second period before P0 of the day before $$\Delta P=P0-P-1; \Delta BP=BP0-BP-1$$

The flow fingerprint via port P equals to $(1-\Delta P/\Delta BP)\times 100\%$ within 15% (coefficient is adjustable). The flow fingerprint is based to set a non-target host as the target point and as the start point of tracing backward.

3. Tracing-Backward Algorithm

The tracing-backward algorithm with the attacked target as the start point is a process and method from determining the attack direction and the final destination port of attack before calculating and judging upward stepwise. It comprises the incremental flow direction algorithm and the source port trunk algorithm.

4. Incremental Flow Direction Algorithm

The incremental flow direction algorithm is one to determine an abnormal traffic via a designated port(s) and its relation with the total abnormal flow into and out from the apparatus is based to identify the source and destination of the incremental data flow and the specific port(s) of the apparatus. Then the port(s) of attack source can be determined:

$$\Delta T \text{ (target) P (Port) (out)=TP0-TP1, Increment of outgoing flow to attacked target}$$

$$\Delta S \text{ (source) P (Port) (in)=(P0-P1) (1-n), all ports except TP}$$

$$\Delta A \text{ (all) P (in)=}\Sigma(P0-P1) \text{ n (in)}-\Delta TP \text{ (out); Increment of in-coming non-attack flow via all ports except TP}$$

$$\Delta A \text{ (all) P (out)=}\Sigma(P0-P1) \text{ n (out)}-\Delta TP \text{ (in); Increment of outgoing non-attack flow via all ports except TP}$$

Coefficient of normal flow fluctuation=$\Delta AP$ (in)/$\Delta AP$ (out) within ±20% (coefficient is adjustable)

Port SP (i) of locked source(s) may have multiple sources: $\Delta SP/\Delta TP \geq 20\%$ (coefficient is adjustable)

Auxiliary determination condition: PPDA (TP)/PPDA (SP) is within ±10% (coefficient is adjustable)

5. Source Port Trunk algorithm

The source port trunk algorithm is one that: when multiple devices on same network level attend a traffic tracing, according to the scattering degree of total data of attack flow in different devices which is obtained from a higher-level network, they will carry out the tracing separately and calculating downward in a cyclical manner to identify a plurality of links. Then the unimportant traced links will be excluded through the port incremental algorithm to finally identify the main attack sources.

Level-I algorithm uses the incremental flow direction algorithm to determine the port(s) of source SP (i) and the quantity-n.

Level-II algorithm identify the uplink port of source SP (i) determined by Level-I as TP(i) and the incremental flow direction algorithm is repeated to identify new SP(i) and the quantity n thereof.

Level-III algorithm repeats Level-II algorithm until a final source(s) or the network boundary (network beyond monitoring by us) is identified.

6. Matching Degree of Attack Link (Degree of Anomaly)

The matching degree refers to confirming the degree of similarity between PPDA of attack port(s) and PPDA of source port(s). According to PPDA of data packet and flow as well as the index of PPDA fluctuation, all the identified attack paths are marked with a matching degree and processed step by step from high to low in terms of matching degree on same trunk level.

$$\text{Matching degree=PPDA (TP)/PPDA(SP)*Fluctuation index of PPDA}$$

$$\text{Fluctuation index of PPDA=BPPDA (SP)/PPDA (SP) or PPDA (SP)/BPPDA (SP) where the one bigger than 1 is selected}$$

7. Stop of Tracing

The tracing in the network link of which the quantity of source port is 0 will be stopped and the corresponding port(s) is marked as source. It can be a network inaccessible to uplink or a source arriving at downlink user.

$$\text{Num(SP)=0}$$

Figure 4:
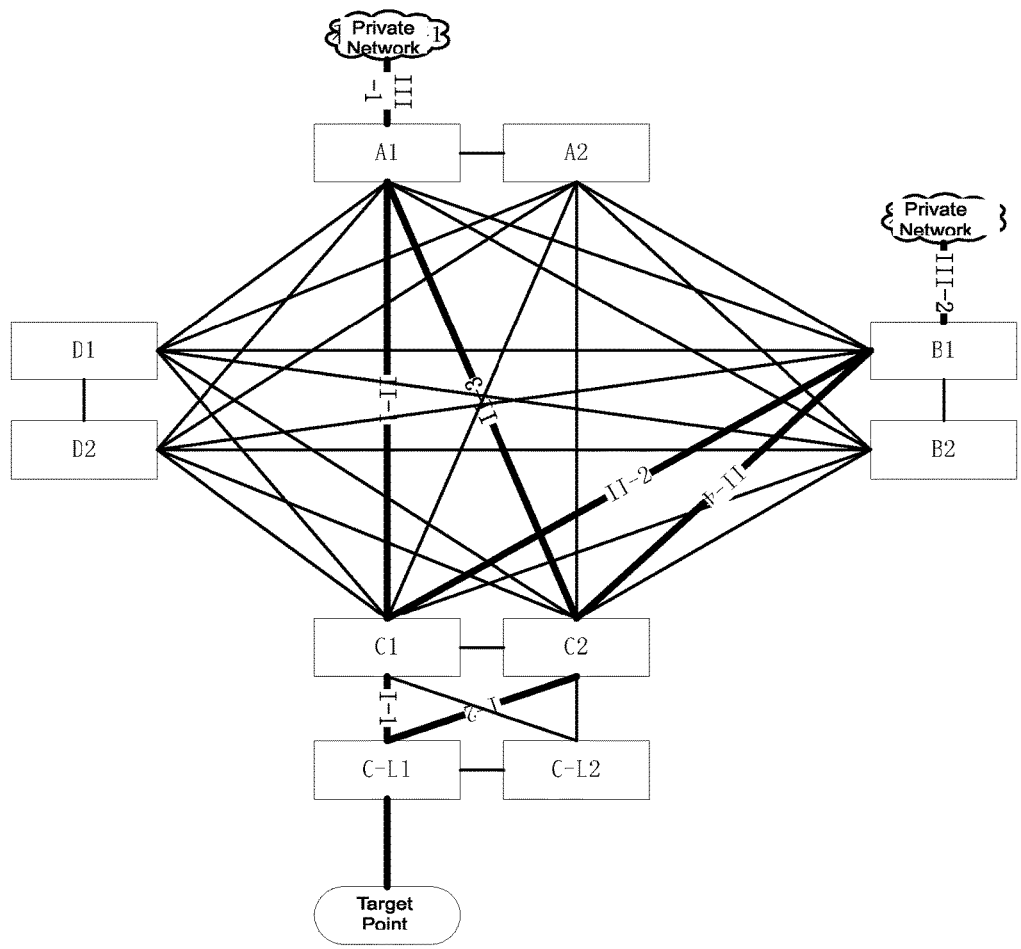
FIG. 4 is a schematic diagram of tracing backward the attack flow in the embodiments according to the present invention.

Below, the technical solution applied in this embodiment is described in detail together with the drawings. The flow diagram of the tracing-backward method in this example can refer to FIG. 4.

Figure 5:
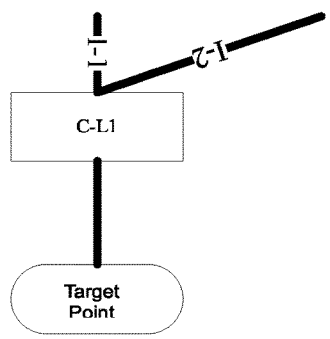
FIG. 5 is a schematic diagram of tracing Level-1 source flow in the embodiments according to the present invention.

As shown in FIG. 5, Level-1 source(s) is identified: the target node (equivalent to tracing start point) is attacked by a data packet flow of 800 k/s from C-L1, that is $\Delta TP=800$ k. The target node here can be a device or a set of devices (a system of similar attributes or applications);

According to executing the incremental flow direction algorithm and the source port trunk algorithm to the collected data at C1-L1, the source port (s) of attack flow into the ports of C-L1 is identified;

| | |
|---|---|
| $\Delta SP$ (C-L1-I-1) = 500k | The matching degree is calculated as 99.8%. |
| $\Delta SP$ (C-L1-II-2) = 300k | The matching degree is calculated as 98.6%. |

Figure 6:
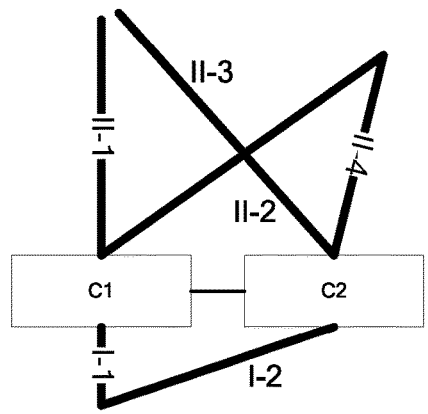
FIG. 6 is a schematic diagram of tracing Level-2 source flow in the embodiments according to the present invention.

As shown in FIG. 6, Level-2 source(s) is identified: the target port(s) is positioned through the uplink ports directly connected with C-L1-I-1 and C-L2-I-2 ports:

▲TP (C1-I-1)=500 k

▲TP (C2-II-2)=300 k.

According to executing the incremental flow direction algorithm and the source port trunk algorithm to the collected data at C1, C2, the source port (s) of attack flow into the ports of C1 and C2 is identified:

| | |
|---|---|
| ▲SP (C1-II-1) = 300k | The matching degree is calculated as 96.2%. |
| ▲SP (C1-II-2) = 200k | The matching degree is calculated as 94.8%. |
| ▲SP (C2-II-3) = 200k | The matching degree is calculated as 95.1%. |
| ▲SP (C2-II-4) = 100k | The matching degree is calculated as 93.5%. |

Figure 7:
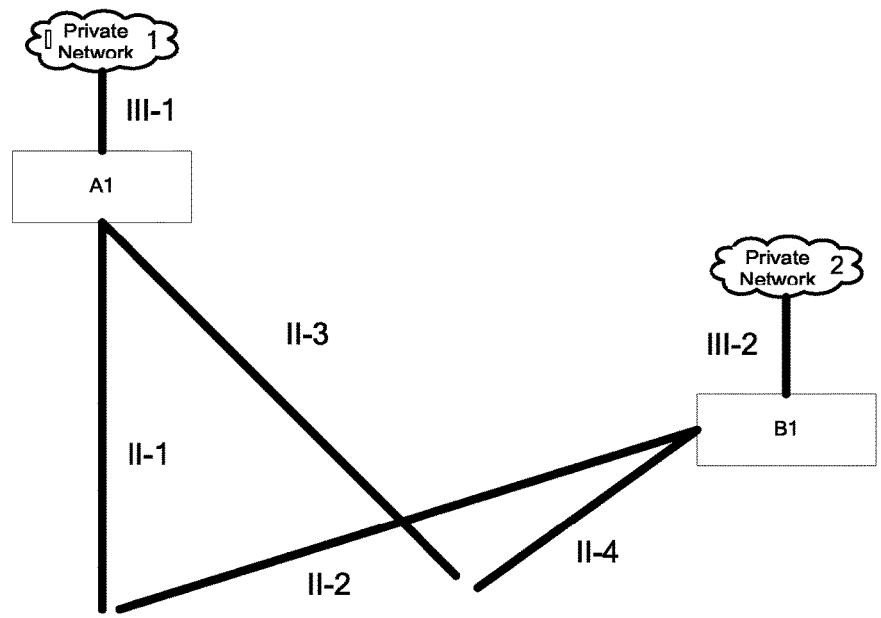
FIG. 7 is a schematic diagram of tracing Level-3 source flow in the embodiments according to the present invention.

As shown in FIG. 7, Level-3 source(s) is identified: the uplink ports connected directly with C1-II-1, C1-II-2, C2-II-3, C2-II-4 are used as the target ports.

▲TP (A1-II-1)=300 k

▲TP (B1-II-2)=200 k

▲TP (A1-II-3)=200 k

▲TP (B1-II-4)=100 k

According to executing the incremental flow direction algorithm and the source port trunk algorithm to the collected data at A1, B1, the source port(s) of attack flow into A1 and B1 is finally identified.

| | |
|---|---|
| ▲SP (A1-III-1) = 500k | The matching degree is calculated as 99.9%. |
| ▲SP (B1-III-2) = 300k | The matching degree is calculated as 99.8%. |

Finally, the attack source(s) is positioned to be the access ports of the private network 1 and the private network 2 (that is, the final stop, to confirm the final attack sources).

A type of software is also provided in another embodiment. This software is used to implement the technical solution described in the embodiments and the preferred embodiments as above.

A type of storage medium is also provided in another embodiment which stores said software. This storage medium includes but is not limited to optical disc, floppy disc, hard disk, erasable memory, etc.

Obviously, those skilled in the art should understand that every module or every step according to the present invention as described above could be realized through a general-purpose computing device. The modules or steps can be installed collectively in one single computing device or can be scattered in a network formed by multiple computing devices. Or optionally, they can be realized through program codes executable by a computing device to achieve same function, which thus can be stored in a storage device to be executed by a computing device. Or each of them can be made into an IC module or several modules or steps of them can be made into a single IC module to perform same functions. In this way, the present intention is not limited to any specific combination of hardware and software.

Those described above are only the preferred embodiments according to the present invention and shall not constitute any limit on the present invention. For those skilled in the art, the present invention can possess various alternations, equivalent replacement, improvement, changes, etc. within the spirit and principles of the present invention should be included within the scope of the invention.

What is claimed is:

1. A method for tracing an attack source in the case of abnormal network traffic, which is characterized in comprising steps of:

from one or more network nodes of an attack link, selecting any or multiple said network nodes as one or more tracing start points, where said attack link is a communication link between an attacked target and an attack source; and according to one or more said tracing start points, identifying one or more higher-level network nodes of said attack link stepwise until a final attack source is confirmed;

wherein any or multiple said network nodes are selected as one or more tracing start points, which comprises steps of:

acquiring the data packet payload via one or more port of a network node in said attack link according to a preset period; and determining said tracing start point according to the data packet payload collected currently and that collected in last said preset period;

wherein said data packet payload is the average for each data packet payload in said preset period;

wherein said average for each data packet payload in a preset period is determined through the following formula, average for each data packet payload in a preset period=Average bandwidth in a preset period/Total quantity of data packets in a preset period;

wherein in the case of multiple said higher-level network nodes, the method further comprises:

discriminating the multiple higher-level network nodes according to the matching degree with said attack link, wherein said matching degree is used to indicate the level of similarity between said average for each data packet payload via one or more tracing start points in a preset period and different averages for each data packet payload via multiple said higher-level network nodes in a preset period;

wherein the step determining said tracing start point according to the data packet payload collected currently and that collected in last said preset period specifically comprises:

determining a fingerprint of the flow via the port(s) of said network node(s) of an attack link according to the data packet payload collected currently and that collected in last said preset period, wherein said flow fingerprint is calculated with the formula as follows:

Flow fingerprint=[1−(▲P/▲BP)]×100%, ▲P=P0−(P−1), ▲BP=BP0−(BP−1), wherein P0 indicates current data; (P−) indicates the data in last period of current preset period; BP0 indicates the data at same moment yesterday; (BP−1) indicates the data yesterday in the period one earlier to current preset period;

wherein in the case that said flow fingerprint does not reach a preset threshold value, the network node corresponding to said flow fingerprint is used as a tracing start point;

wherein the higher-level network node(s) of said attack link is identified stepwise according to said one or more tracing start points, which comprises:

acquiring the increment of incoming flow to said one or more tracing start points and the increment of outgoing flow from said one or more higher-level network nodes, wherein: said increment of incoming flow is the increased flow in the case that the network traffic received by said one or more tracing starting points is abnormal compared to normal network traffic and said increment of outgoing flow is the increased network flow in the case that the network traffic transmitted from said one or more higher-level network nodes is abnormal compared to normal network traffic;

determining of said one or more higher-level nodes as one or more new tracing start points according to the ratio between said increment of incoming flow and said increment of outgoing flow; and determining stepwise of one or more higher-level network nodes of said one or more new tracing start points of said attack link according to said one or more new tracing start points; and wherein the following method is employed to confirm a final attack source:

when the quantity of one or more higher-level network nodes is 0, the one or more network nodes in the next level lower to said one or more higher-level network nodes is determined as a final attack source.

* * * * *